United States Patent [19]

Pittenger

[11] 4,047,225
[45] Sept. 6, 1977

[54] MULTI-ARRANGEMENT MODULARIZED TELEVISION RECEIVER

[75] Inventor: Daniel I. Pittenger, Libertyville, Ill.

[73] Assignee: Zenith Radio Corporation, Glenview, Ill.

[21] Appl. No.: 645,978

[22] Filed: Jan. 2, 1976

[51] Int. Cl.² .............................................. H04N 3/18
[52] U.S. Cl. ................................................ 358/190
[58] Field of Search .................. 178/2.3 R, DIG. 11; 325/492; 307/11, 43, 150, 114; 358/190

[56] References Cited

U.S. PATENT DOCUMENTS

| | | | |
|---|---|---|---|
| 2,808,521 | 10/1957 | Scal | 307/150 |
| 2,988,655 | 6/1961 | Rudolph et al. | 307/114 |
| 3,049,591 | 8/1962 | Voige | 307/150 X |
| 3,843,903 | 10/1974 | Miyoshi et al. | 178/DIG. 11 X |

Primary Examiner—John C. Martin
Assistant Examiner—Aristotelis M. Psitos
Attorney, Agent, or Firm—Roy A. Ekstrand

[57] ABSTRACT

A television receiver includes a plurality of printed circuit modules bearing signal processing and display producing circuitry. A centralized regulated power supply converts the alternating line power to a number of operating voltages. Individual supply and ground return lead pairs connect each module to the central power supply to the exclusion of the remaining modules. Arc suppression circuitry is provided which includes ground return paths distinct from the supply or ground return leads connecting the modules to the power supply.

6 Claims, 1 Drawing Figure

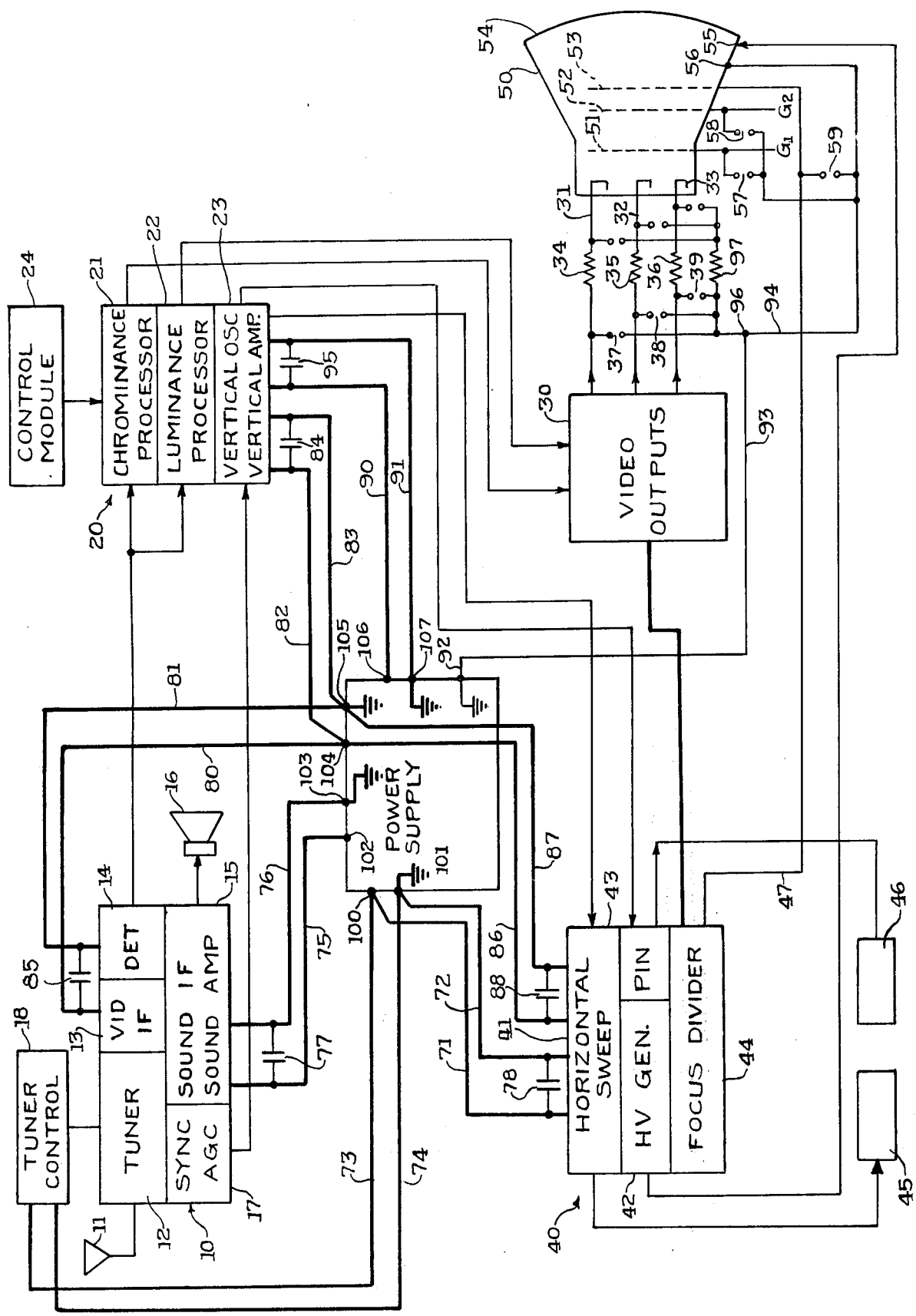

MULTI-ARRANGEMENT MODULARIZED TELEVISION RECEIVER

BACKGROUND OF THE INVENTION

This invention relates generally to construction and fabrication of television receivers and in particular to those using modular construction.

In a typical television receiver a tuner converts a received information-bearing signal to an intermediate frequency signal which is amplified by tuned amplifiers to a level sufficient for information detection. The tuner, intermediate frequency amplifier, and detector process relatively high frequency signals at low amplitudes. The detected components include chrominance, luminance, sound, and deflection synchronizing information. Suitably configured chrominance and luminance amplifiers raise the signal to a level sufficient to drive the control electrodes of a cathode ray tube (CRT) display device.

Deflection circuitry, operative at both the horizontal and vertical scan frequencies, locally generate scan signals timed to the synchronizing information of the received signal and produce electromagnetic scansion of the CRT display device. Deflection circuits are characterized by high power, high amplitude signal processing. In addition to horizontal deflection, the horizontal scan circuits also produce the high voltage CRT accelerating potential by either transformer action or well known voltage multipliers. In either case the abrupt high-current switching of the horizontal deflection circuitry gives rise to high amplitude signals rich in harmonic components often causing substantial interference with other signals.

In the majority of television receivers, a central power supply converts the alternating current line voltage to a suitable DC operating voltage which, in turn, powers the receiver circuits.

Generally color television receivers comprise a plurality of printed circuit boards each supporting a portion of the receiver circuitry thus forming circuit modules. A chassis or frame of stamped metal supports the modules and a harness or wire assembly makes appropriate electrical connections between them. In some receivers, the modules are "hard-wired" via solder connections while in others electrical connections to the modules are made through suitable connector pairs, yielding the advantage of easier removal and replacement. In addition to functioning as a support for the modules, the metal chassis frame also serves as a "ground plane" for the receiver. In accordance with this function, a number of ground connections are made between the modules and the metal chassis. The reasons for these connections will be explained below in greater detail. Suffice it to say here, however, that the metal chassis serves as a ground current return for the modules. The metal frame bearing the printed circuit modules and wire harness is in turn supported in a cabinet enclosure which may also support a CRT and appropriate deflection circuitry together with viewer accessible controls.

The typically used CRT display device comprises a funnel shaped glass envelope having a curved front viewing screen upon which a plurality of phosphor deposits are formed in a predetermined pattern. An electron gun assembly located in the neck of the CRT directs a plurality of electron beams towards the phosphor deposits. The electrons, accelerated by the CRT high voltage potential, impact the phosphor areas and produce appropriately colored screen illumination. As is well known the CRT funnel functions as the dielectric of a high voltage capacitor and stores energy during receiver operation. The presence of this stored energy at accelerating potential in the vicinity of other CRT elements, such as the gun assembly, which operate at much lower potentials, creates a danger of arcing within the CRT. While CRT arcing is a complex phenomenon, it is sufficient here to consider it simply as the discharge of the picture tube capacitance to one or more low voltage points. The sudden energy transfer caused by a CRT arc, if not diverted or somehow controlled, will damage other portions of the receiver.

One mechanism by which arc damage occurs due to high energy transfer to "ultimate" ground (i.e., the metal chassis) is via the ground leads which connect the circuit modules to the chassis frame. Because all such ground leads present some impedance to the high energy arc, receiver circuits coupled to such a ground may be subjected to prohibitive potentials during the brief time required for arc passage. Typically used semiconductor signal processing devices are not capable of withstanding excessive voltages even briefly and the chances of damage during arcing are significant.

When a CRT arc occurs it frequently travels over a number of paths simultaneously. For example, in addition to the above-described ground coupling, an arc may also travel to ultimate ground via the power supply distribution connections of the receiver circuitry. By a mechanism similar to that described for ground coupling the sudden passage of a high energy arc through the power supply leads can damage semiconductor devices coupled thereto.

In most receivers, CRT arc damage is minimized by providing short, low impedance paths between the chassis frame and susceptible points. By careful study of the arching characteristics of each receiver configuration, and the use of appropriate protection circuitry, manufacturers are usually able to minimize arc-related failures. However, if the modules are rearranged to accommodate different cabinets each additional receiver configuration must be "re-engineered" in this respect since new problems of arc damage and signal coupling arise. The manufacturer's desire is to simultaneously satisfy all, or at least many, of the receiver configurations in the product line with a single chassis and thereby achieve greater manufacturing efficiency.

In addition to the difficulties associated with CRT arcing in television receivers, a number of problems in manufacture and operation arise due to the varied frequencies of the processed signals. Such signals, if allowed to interact, produce interference problems or generate undesired resultant signals, either of which may have deleterious effects on receiver performance. Because high frequency signals produce substantial electromagnetic and electrostatic fields about the conductors carrying them, high frequency circuits (such as the tuner and IF) are likely to exchange energy by induction with proximate conductors. It is desirable, therefore, to isolate the high frequency circuits. However, because the high frequency processing circuitry ultimately absorbs power from a source of operating potential through common connection, there exists the possibility of signal coupling where two or more circuits draw current from a common source despite their physical separation. Simply stated, signal coupling occurs when the current surges drawn by the different processing circuits are "mixed" in the common supply. A similar effect, of course, also takes place in ground returns to the extent that circuits share a ground return path. The most common solution to such frequency interference problems is to provide decoupling or filtering networks at the modules to minimize the high frequency current surges in the operating voltage supply. Combination of currents in ground returns is usually minimized by separate short-length connections to the metal chassis frame. Again the process is "tailored" to the particular chassis frame and little, if any, flexibility is achieved.

High amplitude signal processing circuitry, such as the deflection circuits, produce an effect similar to that of high frequency circuitry due to high current surges inherent in their operation. Because the current surges are great, even low frequency signals are often undesirably coupled within the common portions of the operating voltage supply. In addition, conductors bearing high currents notwithstanding low signal frequency are, nontheless, surrounded by substantial electromagnetic and electrostatic fields again giving rise to the probability of undesired coupling between proximate conductors. The typical solution to coupling problems within the operating voltage source in high current circuits is to include individual voltage regulators for each of the high current circuit portions.

As mentioned, once all the above problems of undesired signal coupling and avoidance of arc-caused damage are minimized to a sufficient degree that a particular television chassis is producible, the receiver configuration is relatively inflexible. That is, if reorientation of the printed circuit modules is desired, additional engineering is generally required to again arrive at a producible chassis. Such inflexibility is undesirable in large volume receiver manufacturing operations in which it is advantageous to use a common circuit design which accommodates a number of different cabinet configurations by simple rearrangement of the circuit modules within the cabinet. In the presently manufactured types of receivers, however, each rearrangement of circuitry, even though circuit design remains unchanged, generates new problems of signal coupling and chance of arc damage. These difficulties and resulting inflexibility of the receiver design greatly inhibit the manufacturer's ability to engineer a basic chassis suitable for use in a wide variety of cabinet configurations.

OBJECTS OF THE INVENTION

It is an object of the present invention to provide an improved television receiver.

It is a further object to provide a television receiver having increased manufacturing flexibility together with consistent receiver performance.

SUMMARY OF THE INVENTION

A television receiver comprises display means including a cathode ray tube susceptible to arcing, a centralized regulated power supply defining a first node maintained at a substantially constant first DC voltage and a second node maintained at a substantially constant second DC voltage. A plurality of satellite modules include signal translating circuitry, susceptible to damage by CRT arcing, for processing signals of varied amplitude and frequency which tend to interfere with each other. Support means support the modules and flexible connecting means, including a plurality of conductor pairs, each having a first and second conductor connected to the first and second nodes, respectively, provide individual operating voltage and isolated ground return connections for each of the modules exclusive of the support means, thereby avoiding interference of the signals, minimizing arcing damage to the circuitry, and permitting multiple arrangements of the modules.

BRIEF DESCRIPTION OF THE DRAWINGS

FIG. 1 shows a television receiver constructed in accordance with the present invention in which two distribution systems between the modules, one for signals (indicated by arrows) and a second for operating power (indicated by heavy lines), are depicted. In the interest of clarity, the internal connections between systems on the modules are not shown. The distribution for signals between modules will be described initially without reference to the operating power distribution system.

A high frequency module 10 includes a tuner 12, an intermediate frequency amplifier 13, a detector 14, a sync-AGC system 17 and a sound processor 15. Tuner 12 is coupled to an antenna 11 and a tuner control module 18 and frequency converts the received information bearing signal to an intermediate frequency (IF) signal. The converted signal is raised to an amplitude sufficient to permit information recovery by intermediate frequency amplifier 13. Detector 14 recovers the components of audio, luminance, chrominance and deflection synchronizing information. Sync-AGC system 17 separates the deflection synchronizing information from the remaining information components in the detected signal and derives a gain control error voltage which maintains the output level of IF amplifier 13 substantially uniform. The output of sound processor 15, comprising audio information, is applied to a conventional speaker 16. A tuner control module 18 is coupled to tuner 12 and includes viewer accessible controls (not shown) controlling channel selection.

Module 20 includes a chrominance processor 21, a luminance processor 22 and a vertical scan system 23. The output of sync-AGC 17, comprising a train of deflection synchronizing pulses, is coupled to the input of vertical scan system 23 which locally generates a vertical scan signal timed to the deflection synchronizing pulses. Similarly, the output of detector 14 is coupled to chrominance processor 21 and luminance processor 22. The former separates the chrominance information from the luminance for separate detection and amplification. The latter amplifies, enhances and delays the luminance information in accordance with well-known television principles. A control module 24 is coupled to module 20 and provides viewer accessible adjustments of picture characteristics such as brightness, contrast, saturation and hue.

A horizontal scan module 40 includes a horizontal sweep system 41, a CRT high voltage source 42, a focus voltage source 44, and a pincushion corrector 43. Horizontal sweep system 41 locally generates a horizontal deflection signal which is amplified and applied to a deflection yoke 45 providing electromagnetic scansion of a cathode ray tube (CRT) display device 50. Deflection synchronizing pulses are coupled from vertical scan system 23 to horizontal sweep system 41 to correctly time the scansion. The vertical scan signal produced by vertical sweep system 23 is coupled to pincushion corrector 43 which alters the vertical scan signal to minimize the well-known geometric distortion inherent in CRT scansion. The corrected signal is applied to a deflection yoke 46 producing scansion of CRT 50. Yokes 45 and 46 are shown separate and disassociated from CRT for clarity but are actually combined in a single assembly mounted on the neck of the CRT in accordance with common television receiver fabrication technique.

High voltage source 42 converts the retrace portion of the horizontal scan signals to a high potential which is used to accelerate the electron beams of CRT 50, the operation of which is described below. Focus voltage source 44 is responsive to high voltage generator 42 and produces a CRT focus voltage.

A video output module 30 is coupled to chrominance processor 21 and luminance processor 22 and includes circuitry for matrixing, or combining, the chrominance and luminance signal components into color-video signals suitable for intensity modulating the electron beams of CRT 50. Video output module 30 also may produce appropriate CRT scansion retrace blanking.

Many of the commonly used types of cathode ray tube display devices may be used in the present invention receiver if combined with appropriate supporting circuitry. In the embodiment shown, CRT 50 is of the well-known "unitized" gun construction and includes a trio of cathode electrodes 31, 32 and 33 which are coupled to sources of the color-video signals (not shown) within the video output module 30 via resistors 34, 35 and 36, respectively. CRT 50 also includes a common control grid electrode 51 and a common screen grid electrode 52 each maintained at approximate potentials. A focus electrode 53 within CRT 50 is connected to focus voltage source 44 and an accelerating anode 55 is connected to high voltage source 42. A CRT conductive coating or "dag" 56 is maintained at ground potential. A shadow mask (not shown) is positioned closely adjacent the phosphor deposit viewing screen 54 of the CRT for assuring that each specific "color" phosphor is impacted only by its associated electron beam.

The operation of CRT 50 is conventional in that the three electron beams emanating from cathodes 31, 32 and 33 are directed toward viewing screen 54 while being electromagnetically scanned or deflected both horizontally and vertically. Their relative intensities are controlled by the color-video signals applied to the cathodes for reproducing a color video display.

CRT 50 also has a plurality of components associated with it which function solely to avoid damage to receiver circuitry in the event a CRT arc occurs. A group of spark gaps 37A, 38A and 39A each have one electrode connected to one side of resistors 34, 35 and 36 respectively, and the other connected to a junction 96 which in turn is connected to CRT dag 56 via a low impedance connection 94. A second group of spark gaps 37B, 38B and 39B have one electrode connected to cathodes 31, 32 and 33, respectively, and the other commonly connected via a resistor 97 to junction 96. Similarly, spark gaps 57, 58 and 59 are connected between control grid 51, screen grid 52 and focus electrode 53, respectively, and dag 56.

Spark gaps vary in construction but in general comprise electrode pairs which are separated by an air gap. They have little or no effect upon the receiver until the potential between electrodes exceeds the dielectric breakdown of the gap. Under such conditions (for example, during a CRT arc) the energy "flashes" across the gap. In the present invention receiver, CRT arc energy is limited by the action of the spark gaps and the excess conducted to ground (CRT dag) via low impedance connection 94 rather than the supply or ground leads of the modules.

Turning now to the power distribution system of the receiver shown in FIG. 1, a centralized power supply 70 includes circuitry for deriving a plurality of constant operating voltages as well as regulation circuitry. The plurality of operating potentials are derived by module 70 to best operate the different portions of the receiver. A first operating potential (approximately 12 volts) is established between a positive node 104 and a ground node 105. A pair of connecting leads 80 and 81 connect nodes 104 and 105 to circuitry within module 10. A decoupling capacitor 85 at module 10 is connected across leads 80 and 81. A second pair of leads 82 and 83 connect nodes 104 and 105 to circuitry within module 20 and a decoupling capacitor 84 at module 20 is connected across leads 82 and 83. A third pair of leads 86 and 87 also connect nodes 104 and 105 to circuitry within module 40 and decoupling a capacitor 88 located at module 40 is connected thereacross.

A second operating voltage (approximately 24 volts) is maintained between a positive node 102 and a ground node 103. A pair of leads 75 and 76 connect nodes 102 and 103 to circuitry within module 10 and a decoupling capacitor 77 located at module 10 is coupled thereacross. A third operating voltage (approximately 70 volts) is maintained between a positive node 106 and a ground node 107 which are coupled via leads 90 and 91, respectively, to circuitry within module 20. A decoupling capacitor 95, located at module 20, is connected between leads 90 and 91. A fourth operating potential (approximately 130 volts) is maintained between a positive node 100 and a ground node 101 which are coupled by a pair of leads 73 and 74, respectively, to circuitry within tuner control module 18. A second pair of leads 71 and 72 connect nodes 100 and 101 to circuitry within horizontal sweep module 40 and a decoupling capacitor 78 at module 40 is connected across leads 71 and 72. An auxiliary ground lead 93 couples a grounded node 92 to junction 96. Lead 93 is inductive at high frequencies and provides a low frequency or DC return path for junction 96.

Modules 10, 18, 20, 24, 30 and 40 include printed circuits which comprise typical insulating circuit boards upon at least one side of which a metallized connecting pattern is formed. A plurality of circuit components are supported on the other side, each including appropriate connecting leads which pass through holes in the insulated board forming solder connections with the metallized pattern. In addition, where appropriate, metal shield enclosures may be affixed to the printed circuit boards and maintained at ground potential reducing radiation between internal circuit components and those disposed elsewhere in the receiver.

In the receiver of the present invention, the modules are connected solely by flexible lead or wires and as a result may be arranged in a number of patterns or configurations to suit the cabinet configuration. Because no metal chassis is used as a ground plane or support for the modules, their arrangement is entirely flexible yielding considerable manufacturing advantage. For example, in high volume operations the manufacturer generally produces a wide variety of receiver configurations. Often esthetic requirements and chassis shape are incompatible leading to the manufacture of several chassis configurations of otherwise identical circuitry. As can be seen, the present invention which does not use a metal chassis frame facilitates rearrangement of circuit modules thereby permitting the manufacturer to realize varied esthetic objectives with a single receiver design.

It should be noted that those components associated with arc suppression on and about CRT 50 are provided with ground returns distinct from those of the circuit modules. As a result, the major portion of CRT arc energy travels to ground over paths which do not include either the operating supply voltage or ground connecting leads of the circuit modules. Since it is unnecessary to maintain the modules near a ground plane metal chassis for avoidance of arc damage, longer operating voltage supply and ground return leads for the modules may be used. This, of course, adds to the flexibility of module arrangement.

In each of the modules shown, systems processing signals within a given frequency range are grouped together on one module to the extent practical. The advantages of such an arrangement are two fold. First, the interconnections between like signal frequency systems are maintained within the module, reducing likelihood of radiation to other systems; and second, systems operative within a given frequency range are supplied with operating power from an individual pair of supply and ground return leads to the exclusive of systems operative at potentially interfering frequencies. For example, module 10 includes all of the higher frequency, lower level signal processing circuitry, module 20 processes lower frequency, moderate amplitude signals and horizontal scan module 40 processes extremely high-amplitude harmonic rich signals.

Tuner 12 operates between 60 and several hundred MHz at extremely low signal levels. Intermediate frequency amplifier 13 operates at or about 45 MHz at substantially low signal levels. Detector 14, sync AGC 17 and sound processor 15 are all substantially low level signal processors and are intimately involved with tuner and IF amplifier operation. Because power supply and ground lead pairs 80 and 81 as well as 75 and 76 are distinct from those connecting power supply 70 to other receiver modules, signal cross modulation (via the power supply voltage) between modules is minimized. In addition, decoupling capacitors 85 and 77 "circulate" high frequency signal components processed by the circuitry within module 10 (from supply to ground) to the exclusion of the remainder of the receiver. Again, since the entire supply connection and ground return for module 10 is provided by leads 80, 81, 75 and 76 exclusive of any metal chassis or ground plane, there is no performance dependence upon module placement.

Similarly, module 20 is provided operating power by individual supply and ground return leads 82 and 83, and 90 and 91. Decoupling capacitors 84 and 95 connected across supply and ground return lead pairs at the module circulate signal components (between supply and ground) within module 20 rather than via supply and ground leads.

As mentioned, module 40 includes circuitry processing primarily horizontal scan frequency signals which due to the high current switching inherent in horizontal scansion and high voltage generation create substantial danger of signal interference with other systems. The high surge-current demands of the horizontal scansion circuitry within module 40 tend to "modulate" the operating voltage of other systems sharing a common supply with it. However, since individual operating supply and ground return leads 71 and 72 as well as 86 and 87 connect module 40 to power supply 70, the operating voltages coupled to the remaining modules within the receiver are virtually unaffected. Further, decoupling capacitors 78 and 88, connected between the supply and ground lead pairs, circulate harmonic signal components produced within module 40 to the exclusion of the supply and ground return leads thereby minimizing danger of undesired signal coupling.

The receiver shown utilizes a plurality of satellite modules which support circuitry grouped for commonality of either frequency of signal processed or amplitude of current demands. Each module is connected to a centralized regulated power supply via individual operating supply and ground return lead pairs to the exclusion of other modules. The result is a television receiver which does not require a metal chassis for support or ground plane and is, therefore, virtually unrestricted in its module arrangement or configuration. Unlike prior art receivers in which problems of supply modulation, signal interference coupling, ground current coupling and arc suppression must be dealt with on a "chassis-by-chassis" basis, the present invention receiver maintains all required supply ground and arc suppression current paths for the circuit modules exclusive of the means supporting them.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A television receiver comprising:
   display means including a cathode ray tube susceptible to arcing;
   a centralized regulated power supply defining a first node maintained at a substantially constant first DC voltage and a second node maintained at a second substantially constant DC voltage;
   a plurality of satellite modules, including signal translating circuitry processing signals of varied amplitude and frequency tending to interfere with each other, said circuitry susceptible to being damaged by said arcing;
   support means supporting said modules; and
   flexible connecting means, including a plurality of conductor pairs each having a first and second conductor connected to said first and second nodes, respectively, said conductor pairs providing individual operating voltage and isolated ground return connections for each of said modules exclusive of said support means thereby avoiding interference of said signals, minimizing damage to said circuitry, permitting multiple arrangements of said modules.

2. A television receiver as set forth in claim 1, wherein selected ones of said plurality of satellite modules include:
   decoupling means, connected to said first and second conductors, filtering said first DC voltage.

3. A television receiver as set forth in claim 2, wherein said signal translating circuitry is distributed among said plurality of satellite modules such that circuit portions processing signals having frequency relationships conducive to interference are located on different ones of said modules.

4. A television receiver as set forth in claim 3, wherein portions of said signal translating circuitry processing high amplitude signals are situated on different ones of said modules from portions processing low amplitude signals.

5. A television receiver as set forth in claim 4, wherein said satellite modules do not include voltage regulating circuitry.

6. A television receiver as set forth in claim 5, wherein said support means are formed of electrically nonconductive material.

* * * * *